United States Patent
Kaneko et al.

[19]

[11] Patent Number: 6,130,395
[45] Date of Patent: Oct. 10, 2000

[54] METHOD AND APPARATUS FOR ACHIEVING A FINE SURFACE FINISH IN WIRE-CUT EDM

[75] Inventors: Yuji Kaneko; Tatsuo Toyonaga; Daisuke Sadamitsu; Tatsuo Kuloda, all of Kanagawa, Japan

[73] Assignee: Sodick Co., Ltd., Kanagawa, Japan

[21] Appl. No.: 09/098,540

[22] Filed: Jun. 17, 1998

[51] Int. Cl.[7] .............................. B23H 1/00; B23H 7/04
[52] U.S. Cl. .................................. 219/69.12; 219/69.17; 219/69.18
[58] Field of Search ............................. 219/69.12, 69.18, 219/69.17, 69.13

[56] References Cited

U.S. PATENT DOCUMENTS

| | | | |
|---|---|---|---|
| 4,970,362 | 11/1990 | Ono | 219/69.12 |
| 5,041,984 | 8/1991 | Watanabe | 219/69.17 |
| 5,083,000 | 1/1992 | Sakaue | 219/69.12 |
| 5,149,931 | 9/1992 | Magara | 219/69.18 |
| 5,874,703 | 2/1999 | Derighetti et al. | 219/69.18 |
| 5,897,792 | 4/1999 | Kaneko et al. | 219/69.18 |
| 5,922,221 | 7/1999 | Ui | 219/69.17 |

FOREIGN PATENT DOCUMENTS

| | | |
|---|---|---|
| 0 747 158 A1 | 11/1996 | European Pat. Off. . |
| 61-164718 | 7/1986 | Japan . |
| 8-150515 | 6/1996 | Japan . |

*Primary Examiner*—Geoffrey S. Evans
*Attorney, Agent, or Firm*—Paul Devinsky; McDermott, Will & Emery

[57] ABSTRACT

A wire-cut EDM method and apparatus for machining to a fine surface roughness of 1 $\mu$m Rmax or less. Two power supplies and a electrode polarity switching system are used. A first high energy power source is used for initial profile cutting and may also be used for one or more later cuts while the machining pulse parameters, and feed rate and offset are adjusted for increasing less rough surface finishes. The wire electrode is held at negative machining potential. A second power supply and smaller offset values are used for later cuts to create lower values of surface roughness, while still maintaining the wire electrode at a negative machining potential. Finally, in order to create a fine finished surface (Rmax$\leq$1 $\mu$m), the offset is further reduced and the wire electrode polarity is reversed.

20 Claims, 5 Drawing Sheets

| | ELECTRODE POLARITY | ON TIME | OFF TIME | PEAK CURRENT | GENERATOR OUTPUT VOLTAGE | POWER SUPPLY | CUTTING FEED RATE | OFF SET (μm) | SURFACE ROUGHNESS (μRmax) |
|---|---|---|---|---|---|---|---|---|---|
| 1ST CUTTING | − | 0.2 μS. | 9.5 μS. | 60A | 120V | PS1 | .18mm | 82 | 20 |
| 2ND CUTTING | − | 0.4 μS. | 5.5 μS. | 25A | 80V | PS1 | 1.4mm | 58 | 18 |
| 3RD CUTTING | − | 1 μS. | 6.5 μS | 24A | 80V | PS2 | 4.3mm | 57 | 13 |
| 4TH CUTTING | − | 0.5 μS | 4.5 μS | 12A | 80V | PS2 | 8.8mm | 57 | 8 |
| 5TH CUTTING | − | 0.5 μS | 3 μS. | 5.6A | 80V | PS2 | 5.8mm | 56 | 4 |
| SEMI-FINAL CUTTING 1 | − | | | | 265V | PS2 | 6mm | 54 | 1.5 |
| SEMI-FINAL CUTTING 2 | − | | | | 240V | PS2 | 6mm | 52 | 0.75 |
| FINAL CUTTING 1 | + | | | | 210V | PS2 | 5mm | 51 | 0.65 |
| FINAL CUTTING 2 | + | | | | 150V | PS2 | 5mm | 50 | 0.4 |

FIG. 4

METHOD AND APPARATUS FOR ACHIEVING A FINE SURFACE FINISH IN WIRE-CUT EDM

FIELD OF THE INVENTION

The present invention relates to a wire cut electric discharge machine and to a method of machining using a wire cut electric discharge machine where a workpiece is machined by electric discharges, and in particular to a wire-cut electric discharge machining method used to further finish the machined surface of a workpiece to a fine surface roughness, and to a wire cut electric discharge machine used to obtain that fine surface finish after a workpiece is machined to a desired profile using a wire electrode.

BACKGROUND OF THE INVENTION

Electric discharge machining is a machining method in which an electrode and a workpiece oppose each other across a machining gap, and a voltage is applied between the electrode and the workpiece to generate acontinuous electric discharge between the two so as to perform machining. The energy to create the electric discharges is supplied as a pulse current from a power supply device. This energy is applied to the workpiece as electric discharge energy to machine the workpiece. When an electric discharge is generated between the electrode and the workpiece, there is a sudden rise in temperature due to electric discharge energy at the electric discharge generation point (the electric discharge point) of the workpiece, whereby the workpiece material locally melts and vaporizes. At the same time, a sudden rise in pressure occurs at the electric discharge point, and the melted, vaporized material is blown away, forming a crater-shaped hole in the workpiece. Electric discharge machining is carried out by generating a continuous electric discharge in the machining gap formed between the electrode and the workpiece while a dielectric fluid (typically a high resistively machining fluid)—for example mineral oil or water having extremely high relative resistance (deionized water) is interposed therein. Therefore, after an electric discharge is generated, the electric discharge point is cooled by the machining fluid, while at the same three the machining waste produced is removed from the vicinity of the electric discharge point.

It is known that electric discharge energy is consumed not only for the removal of the workpiece material, but also for removal of material from the machining electrode side, and results in damage to the electrode. This is usually referred to as electrode wear. The phenomenon of electrode wear is difficult to avoid in electric discharge machining. The wear rate of electrode material relative to the amount of material removed from the workpiece varies greatly depending upon the conditions of the electric energy supplied to the machining gap—which include for example the electric discharge time, the electric discharge current, the electrode and the workpiece polarity, and the electrode and the workpiece material. Therefore electric discharge machine operators typically select and set appropriate machining conditions for different workpiece machining stages, such as rough-cuts, second-cut (or mid-cuts) and finish cuts.

In a vertical (or die sinking) electric discharge machine, rough cut machining for roughing out a shape, to mid-cut machining for machining to a machined surface roughness of approximately 5 $\mu$m Rmax, is typically performed by supplying pulse current having a peak current value in the range of approximately 10 to several 100 amperes over an electric discharge time in the range of approximately 10 to several 1000 $\mu$sec. When machining under such conditions, the working electrode is usually connected to the positive pole of the electric discharge power supply circuit, and the workpiece is usually connected to the negative pole thereof. With such machining conditions, i.e., using such discharge times and peak current values, machining can be carried out with an electrode wear of less than a few percent by setting the electric discharge time and peak current values to be in a specified ratio. For conventional finish machining, that is for a finish surface roughness of less than 5 $\mu$m Rmax, a peak current energy of less that a few amperes at a short electric discharge time in the range of from about 10 $\mu$sec to 0.5 $\mu$sec is used. When operating in this regime, the working electrode is usually connected to the negative pole of the electric discharge power supply circuit, and the workpiece to the positive pole. As compared to connecting the working electrode to the positive pole of the electric discharge power supply circuit, using a negative polarity working electrode results in an approximately 30% decrease in electrode wear. In other words, machining with a positively poled working electrode and discharge times in the range of from about 10 to 0.5 $\mu$sec results in a higher wear rate electrode as compared to a negatively polarity working electrode. Further, using a negatively poled working electrode results in stable electric discharge machining and a fine surface finish at several times the machining speed as would be obtained using a positively poled working electrode.

As it relates to machining speed, in contrast to vertical electric discharge machine, the machining conditions used in a wire cut electric discharge machine typically comprise an electric discharge time in the range of from about 100 nsec–10$\mu$sec and an electric discharge current peak value in the range of approximately 1600 A to 1 A. With regard to polarity, machining is usually performed with the wire electrode connected as the negative pole. This is because with the reverse polarity, the electrode would tend to wear excessively; not only would machining not progress well, but the wire electrode would also be likely to open (break). Therefore, in a wire cut electric discharge machine, except for cases in which an alternating current pulse is supplied, the wire electrode is almost always held at a negative polarity relative to the workpiece. The connection of the power supply cable is physically fixed such that the wire electrode is connected to the negative pole of the power supply, and the workpiece to the positive pole.

During wire cut electric discharge machining, a wire made of brass, copper, tungsten or other material, wound around a supply reel and having a diameter of from about 0.03 mm to 0.35 mm, is fed from the spool and guided along a wire travel path by means of a wire guiding device in which wire guides are positioned on either side of the workpiece. The wire is continuously fed while applying a specified tension to it as it travels trough the machining zone. An electric discharge is generated between the tensioned portion of the wire electrode and the workpiece. A typical wire cut electric discharge manufacturing process begins with a rough cut, also referred to as a "first cut," in which the workpiece and the wire electrode are moved relative to one another under control of a numerical control (NC) device while the electric discharge is generated, thus forming a desired profile shape in the workpiece. Typically the next step(s) is to further refine the machined surface roughness while increasing the accuracy of the machined shape. During this step(s), the profile path over which the wire electrode is guided is shifted by a specified amount toward the product side, and the surface and shape of the workpiece which will become the product of the process are finished under lower electrical energy conditions. This step is referred to as the second cut or third cut (or more generally mid-cut), depending on the number of passes.

In recent years there has been a tendency to increase the final product machining roughness requirement, from less than about 2 μm Rmax to less than about 1 μm Rmax. However, the electric discharge energy used to achieve a surface roughness of less than 2 μm Rmax is extremely small, and requires that the machining gap be quite narrow. For this reason, the greater the demand for finer machined surface roughness, the smaller, proportionally, must be the electric discharge energy, making machining difficult. Under such finish machining requirements the machining gap must be maintained at only a few microns. Given such spacing, the static electricity forces at work between the wire electrode and the workpiece increases, such that a force works to tend to pull the wire electrode toward the workpiece. In machining regions in which the electric discharge energy is of a certain strength, the electric discharge pressure generated by electric discharge works as a reaction force, so the effects of the static electric force are not conspicuously manifested. But, when electric discharge energy is small, the electric discharge reaction force is also small, and a vibration phenomenon may be created in the wire electrode when affected by the static electric forces. This makes stable machining very difficult. Furthermore, the effects of wire electrode vibration may be manifest on the workpiece surface in the form of line-shaped marks, such that the desired surface roughness cannot be obtained.

OBJECTS OF THE INVENTION

An object of the present invention is to provide a device and method to obtain a fine wire-cut machined surface roughness under stable machining.

A further object of the invention is to provide a device and method to achieving machined surface having a surface roughness improved beyond that which achievable by previous wire-cut machining methods.

Yet a further object of the present invention is to provide a method to obtain the required surface roughness in a stable manner, reducing to a minimum the effects caused by electrode vibration, etc., by increasing electric discharge reaction by providing increased electric discharge energy to perform the machining steps from the first cuts through final finish cut, particularly in the machining steps which are affected by static electricity forces, and to provide a wire cut electric discharge machine with which to implement that machining method. Other objects will become apparent to the artisan from the description which follows or may be learned and appreciated by practice of the invention.

SUMMARY OF THE INVENTION

In order to achieve the above and other objects, a wire cut electric discharge method is provided for machining in interposing a dielectric machining fluid, preferably mineral oil, in a machining gap formed between a workpiece and a wire electrode and supplying electrical energy between the workpiece and the wire electrode so as to generate an electric discharge in the gap, the machining method comprising:

forming a desired profile shape in the workpiece by moving at least one of the wire electrode and the workpiece relative to each another with the wire electrode connected to a negative pole and the workpiece connected to a positive pole of an electric discharge power supply;

shifting the path through which the electrode passes over the profile shape by a specified amount toward the product profile and machining at a lower discharge energy so as to lessen the machined surface roughness and increase the machining accuracy; and finishing the machined surface to a roughness of less than 1 μm Rmax, while machining at an even lower discharge energy and reversing the polarity of the wire electrode and the workpiece.

In addition, a wire cut electric discharge machine is provided which machines by interposing a dielectric machining fluid, Preferably mineral oil, in a machining gap formed between a workpiece and a wire electrode and supplying electrical energy between the workpiece and the wire electrode so as to generate an electric discharge in the gap, the wire cut electric discharge machine including:

a first power supply circuit for supplying high energy to the matching gap for forming a profile shape in the workpiece;

a second power supply circuit for supplying a lower energy to the machining gap than that of the first power supply circuit for machining to form a more accurate profile and a machined surface having less roughness;

a third power supply circuit for supplying a lower electric discharge energy to the machining gap than the second power supply circuit;

a finish machining switch for connecting the wire electrode to the positive pole and the workpiece to the negative pole of the third power supply circuit.

BRIEF DESCRIPTION OF FIGURES

The accompanying drawings, which are incorporated into and form a part of the specification together with the description, serve to explain the principles of the invention. In the drawings:

FIGS. 5 (A), (B), (C), (D), (E) are diagrams, respectively depicting surface roughness states from the fifth cutting step to the final cutting step;

FIGS. 5 (C1), (D1), and (E1) are magnified portions of the machined surface from FIGS. 5 (C), (D) and (E) respectively.

PRESENTLY PREFERRED EMBODIMENT

Reference will now be made in detail to a presently preferred embodiment of the invention, an example of which is illustrated in the accompanying drawings.

It is known that the machine surface roughness in electric discharge machining is reduced when the electric discharge energy supplied is reduced. However, as electric discharge energy is reduced, machining becomes difficult for various reasons, and improvement of surface roughness becomes extremely difficult. An aspect of the present invention is the inventor's appreciation of the problems to be considered and overcome in obtaining a fine machined surface, i.e. a surface roughness of less than 2 μm Rmax and preferably less than 1 μm Rmax. As a result of the present inventor's research, they appreciated that in order to improve machined surface roughness to and beyond 2 μm Rmax, including accounting for the effects of static electricity, the following factors would need to be considered and resolved.

(1) In the electric discharge energy conditions used to obtain a surface roughness of less than 2 μm Rmax, and in particular less than 1 μm Rmax, the effects of gravity are large, the balance of the electric discharge repulsion force and wire tension is degraded, and the wire electrode tends to vibrate.

(2) Tension fluctuations in the wire supply mechanism impart unavoidable vibration to the wire electrode.

(3) In the process operating region in which a fine machined surface is obtained, the electric discharge pressure created by electric discharge is reduced. It becomes difficult for ions or waste generated by the machining process to migrate away from the electric discharge point, causing shorting phenomena and concentrated electric discharges to occur more easily. Thus, it becomes more difficult for continuous electric discharge to occur uniformly over the surface to be machined.

(4) Because tars generated by machining adhere to the negative pole, the machining gap insulation does not sufficiently recover between discharges, and accumulated tar may act as a resistor in the discharge circuit.

(5) There is a limit to the control of electrical pulse energy which can be provided for electric discharge. It is not possible to limitlessly reduce electric discharge energy due to the effects of the stray capacitance of a particular electric discharge machine and the capacitance component generated between the wire electrode and the workpiece.

If all of the above-noted effects: static electric effects (1), wire supply mechanism effects (2), removal of machining products from the machining gap (3) and (4), and the stray capacitance of the particular device (5) can be resolved, the machined surface roughness can be improved. Of the items mentioned, effects (1) and (2) are due to wire electrode vibration, and effect (2) is a wire supply mechanism problem, so some improvement in surface roughness can be expected from improvements in wire electrode tension control. However, effect (1) is a physical phenomenon, and the only way to weaken the static electrical force is to increase the electric discharge energy in order to raise the electric discharge repulsion force. This is diametrically opposed to the reduction of electric discharge energy in order to obtain a smaller machined surface roughness. Regarding the stray capacitance of a particular device, effect (5), the inventors were able to reduce the stray capacitance present in the machining gap to approximately 100 pf by devising a solution in the device wiring (described below). However, the capacitance component generated in the machining gap is inversely proportional to the distance between the two electrodes, and cannot be brought to zero so long as the electrode and the workpiece are arrayed in opposition to one other across a narrow machining gap. Similarly, the more the electric discharge energy is reduced, the narrower the machining gap will become, and the static electric force working between the two electrodes will increase in inverse proportion to the square of the distance between the two, causing an undesirable electrode vibration. In other words, after a certain point, further lowering of the machining energy creates an effect opposite to that of reducing the machined surface roughness and at best imparts a non-negligible influence, resulting in a limit on minimum surface roughness improvements.

The present invention considers the ratio of a given electric discharge energy consumed in the electrode and the workpiece, and considers experimental comparisons in the differences in machined surface due to differences in machining polarity. The inventors have determined that machining using the conventional wire-cut machining polarity, whereby the wire electrode is maintained as the negative pole and the workpiece is maintained as the positive pole, and machining using a reverse machining polarity, whereby the wire electrode is maintained as the positive pole and the workpiece is maintained as the negative pole, provide essentially the same energy to the machining gap in order to generate electric discharge.

Figure 1:
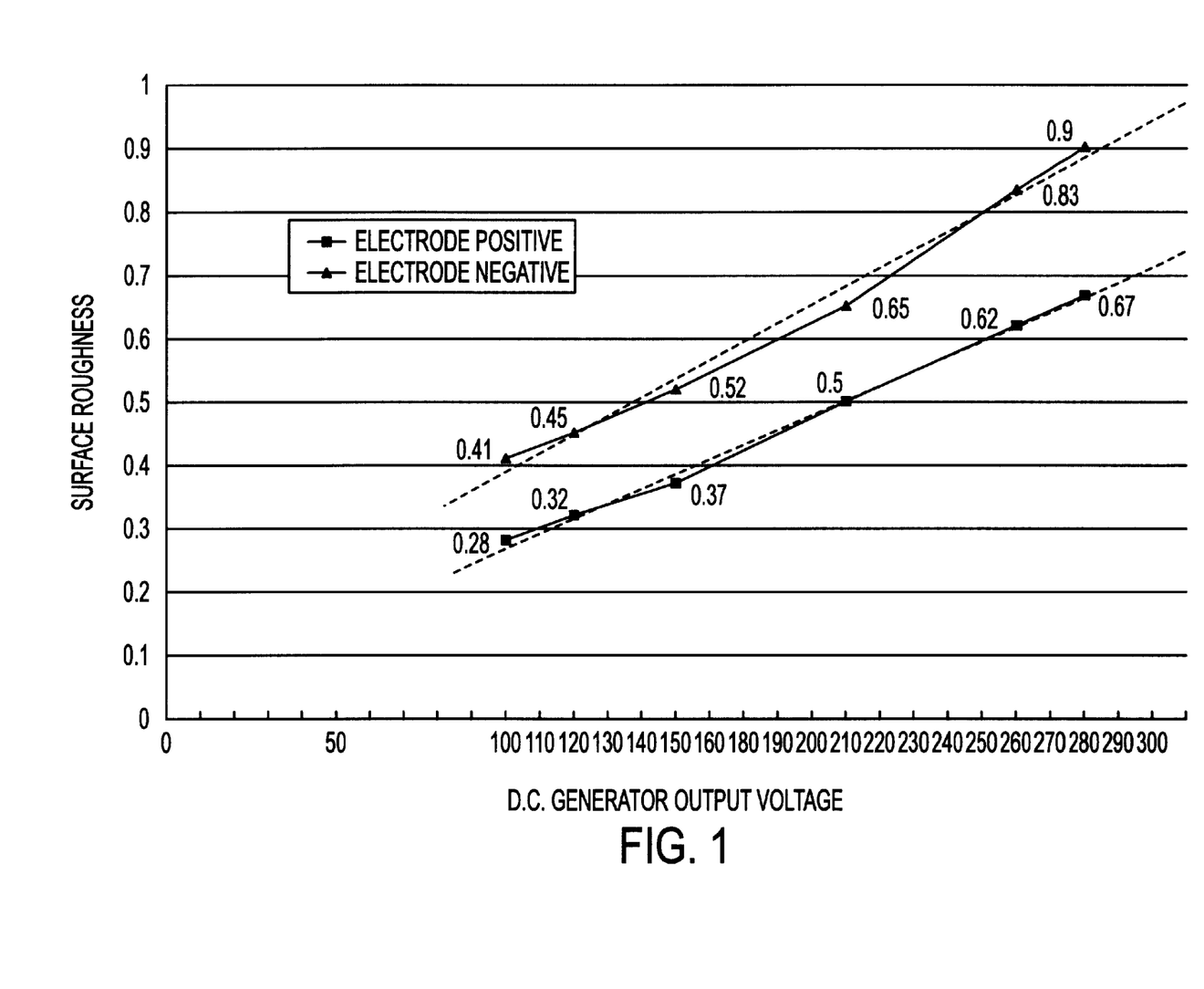
FIG. 1 is a graph showing the relationship between electric discharge energy and machined surface roughness with a working electrode positive poled and a working electrode negatively poled.

FIG. 1 is a graph showing the results of machining in which the machining energy is gradually reduced using a power supply circuit which supplies a very small electric discharge energy (described below) while machining the surface of a 10 mm thick steel material workpiece under electrical energy conditions for a machined surface roughness of approximately 3 μm Rmax, where the wire electrode was the negative pole. FIG. 1 illustrates the output voltage V from the direct current power supply circuit on the horizontal axis, and the measured surface roughness of the workpiece on the vertical axis. The amount of energy supplied to the machining gap is determined by the current supply time length, the current control resistance value, and the applied voltage V (output voltage V). If the current supply time and the current control resistor values are the same, it may be assumed that energy will change with the applied voltage V. The points plotted as triangles in the diagram indicate the surface roughness obtained when a very small electric discharge energy is supplied by the power supply circuit (RLC circuit) with the wire electrode negatively poled, as a function of output voltage V. The points plotted as squares illustrate the surface roughness when the wire electrode polarity is positive. From the standpoint of the experimental results, the surface roughness when machining is performed with a positive wire electrode polarity was between 0.70 and 07.5 times the surface roughness for a negatively poled wire electrode at the various electric discharge energies plotted. From this experimental graph, it may be seen that when machining requires a machined surface roughness of, for example, 0.5 μm Rmax, the required surface roughness can be obtained with a 210 V machining output voltage if the wire electrode polarity is positive. In contrast, when machining with a negatively poled wire electrode, a 0.5 μm Rmax surface roughness cannot be obtained unless machining is done at approximately 140 V. These results demonstrate that using the machining polarity of the present invention, the same 0.5 μm Rmax surface roughness can be obtained even if an energy of approximately 1.5 times the conventional machining polarity electric discharge energy is supplied. Consistent with the principle that if a higher output voltage is used, the effects of static electricity tend to decrease (as the machining gap distance increases), while at the same time the repulsion force due to electric discharge increases, and the balance of repulsion force resisting gravity due to static electricity improves. Thus, the inventors conclude that more stable machining under finish cut conditions can be achieved when the wire electrode is machined as the positive pole. Furthermore, as the pressure rise due to the electric discharges generated in the machining gap increase, and residual machining waste and tar in the machining gap become diffused and are more easily removed.

In the experiments, surface roughness was measured for electric discharge energy conditions down to an output voltage of about 100 V. This is because when machining at an output voltage below 100 V, and with a smaller machining gap, a rather high level of skill, beyond that possessed by many operators, is required to machine using a negative wire electrode polarity. Therefore, the inventor's comparative investigation focused in a practical, usable range. Under these conditions, the best surface roughness obtained with the present machining method, using a positive electrode polarity, was 0.28 $\mu$m Rmax. In comparison, when using the conventional machining polarity, a negative polarity, it was only possible to obtain a machined surface roughness of 0.41 $\mu$m Rmax. This demonstrates a distinct advantage of the present invention. The inventors also demonstrated that when the workpiece is tungsten carbide (a sintered alloy), a 0.23 $\mu$m Rmax machined surface roughness can be obtained.

Figure 2:
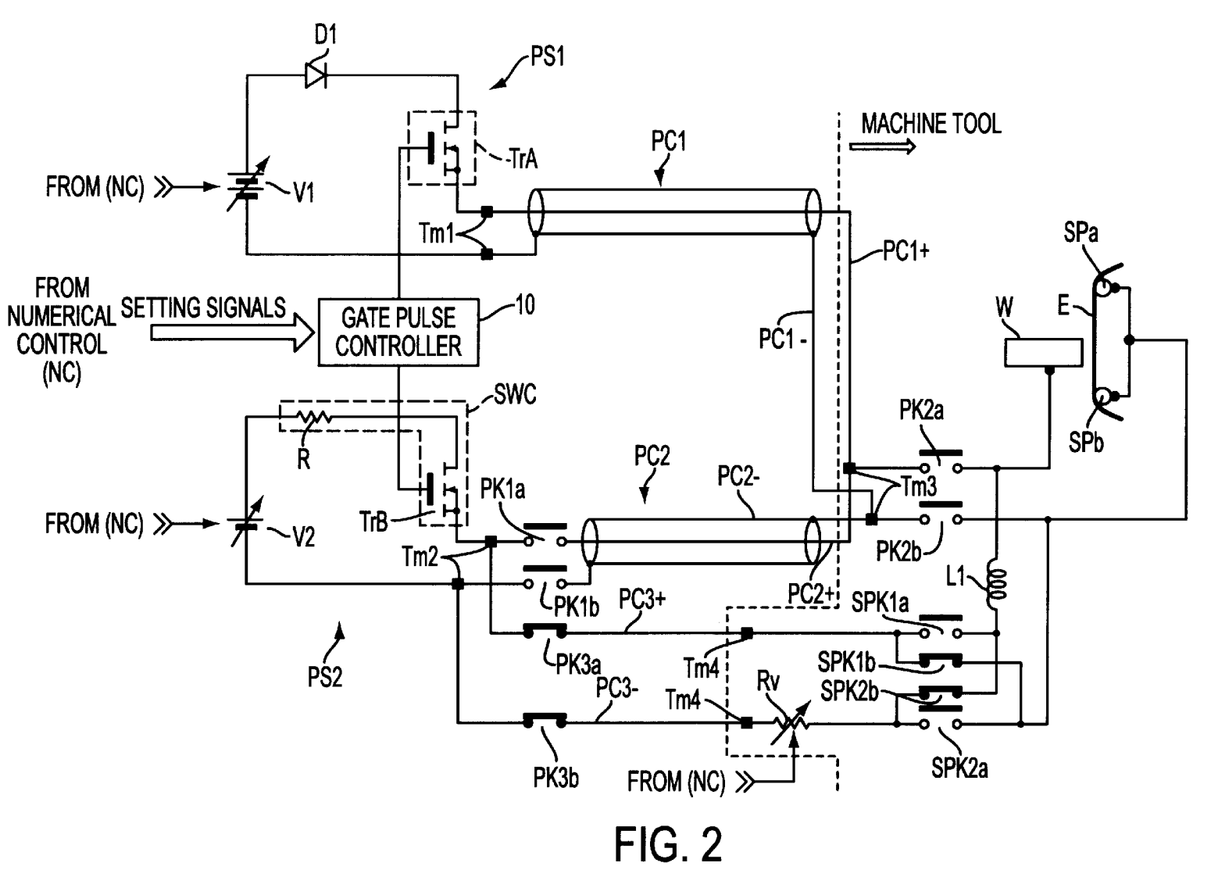
FIG. 2 is a diagram showing the overall configuration of a wire cut electric discharge machine provided with a first power supply which supplies a high peak current energy, a second power supply which supplies a peak current energy lower than that of the first power supply, and a circuit for generating a small discharge energy to the machining gap.

FIG. 2 illustrates a specific embodiment of a device for performing wire cut electric discharge machining according to the present invention. In the embodiment of FIG. 2, a circuit capable of supplying electric discharge energy for all manufacturing steps, from a rough cut to a final finishing cut is provided. The circuit includes two power supplies. A first power supply device PS1, has essentially no circuit resistance, for supplying a high peak current. The first power supply comprises a variable, direct current power supply V1, which supplies, for example a 60–300 V output, a reverse current blocking diode D1 and switching elements TrA formed of multiple FETs connected to one another in parallel. A second power supply device PS2, has multiple groups of switching circuits SWC, each group comprising switching elements TrB which are preferably FETs connected in series with a current limiting resistor(s) R, which is in turn connected to the positive side of a variable voltage direct current power supply V2, which supplies a voltage from, for example, 80 to 300 V.

The wiring on the positive side of the power supply device PS1 is connected to the source of the multiple switching elements TrA through the reverse current blocking diode D1, and the TrA drain wiring is joined together as a unit at a terminal Tm1, and is guided, along with the wiring from the negative side of the power supply device PS1, by a coaxial shielded power cable PC1 to a terminal Tm3 on the machine chassis. The positive side wiring PC1+ is connected to the workpiece through an electromagnetic switch contact PK2a provided on the machine side near the machining region. The negative side wiring PC1− of the power supply device PS1 is connected to a pair of electrical feeders SPa and SPb which feed current to a wire electrode E through an electromagnetic switch contact PK2b.

The wiring on the positive side of the power supply device PS2 is joined together as a unit at terminal Tm2 through multiple switching circuits SWC, and is connected to the coaxial shielded power cable PC2 through electromagnetic switch contact the PK1a. The wiring from the negative side of the power supply device PS2 is also connected to the coaxial shielded cable PC2 through an electromagnetic switch contact PK1b. The two wires PC2+ and PC2− from the power supply device PS2 are guided to the vicinity of the machining region in the machine body by means of the coaxial shielded power cable PC2, and join the coaxial shielded power cable PC1 at a terminal Tm3 before the electromagnetic switch contacts PK2a and PK2b. In the illustrated embodiment, the wiring to the machine body from the power supply PS1 and the power supply device PS2 preferably uses two paths: the coaxial shielded power cables PC1 and PC2. However, as should be appreciated by the artesian, the present invention is essentially not affected even if a single path is used.

The output of the power supply device PS2 branches at terminal Tm2 and is brought to the machine body by another pair of output supply cables PC3+ and PC3−. The output supply cable wiring PC3+ and PC3− are connected to the rest of the circuit by a polarity switching section provided on the machine body at a terminal Tm4 through the respective electromagnetic switch contacts PK3a and PK3b respectively. The polarity switching section is preferably connected using two of the four electromagnetic switch contacts in the manner illustrated so as to cross the wiring from the power supply device PS2. In other words, when the electromagnetic switch contacts SPK1b and SPK2b are connected, the wiring PC3+ from the power supply device PS2 is connected to the wire electrode, and PC3− is connected to the workpiece side. When the electromagnetic switch contacts SPK1a and SPK2a close, the wiring PC3− goes to the wire electrode, and PC3+ goes to the workpiece side.

The illustrated circuit embodiment, for when supplying a very small electric discharge energy as described below, a resistor, for example, a 500 Ω to 2 kΩ variable resistor Rv as shown in FIG. 2 in series with the electromagnetic switch SPK contact is provided in the polarity switching section, and an inductance L1 is provided within the wiring from the electromagnetic switch contact to the workpiece W. The inductance L1 also has the role of counteracting the stray capacitance component in the wiring; an inductance of approximately 500 $\mu$H is preferable. Also, while the variable resistor Rv is shown in FIG. 2 as a resistor (having a resistance from about 500 Ω to 2 kΩ), as will be appreciated by the artisan based on the above, that control by an NC device would be made simpler by providing multiple resistors and connecting them in such a way that some number of resistors can be selectively connected in parallel through an electromagnetic switch contact.

In FIG. 2 the variable resistor Rv and polarity switching section electromagnetic switch are shown on the machine side as the preferable arrangement. But, except for the inductance L1, these elements may alternatively be provided on the power supply device PS2 side with the scope of the present invention. Further, the polarity switching section of the present invention is exemplified using an electromagnetic switch, but the machining polarity may also be switched by forming a bridge circuit using a switching element and controlling the conducting state of each switching element.

Figure 3:
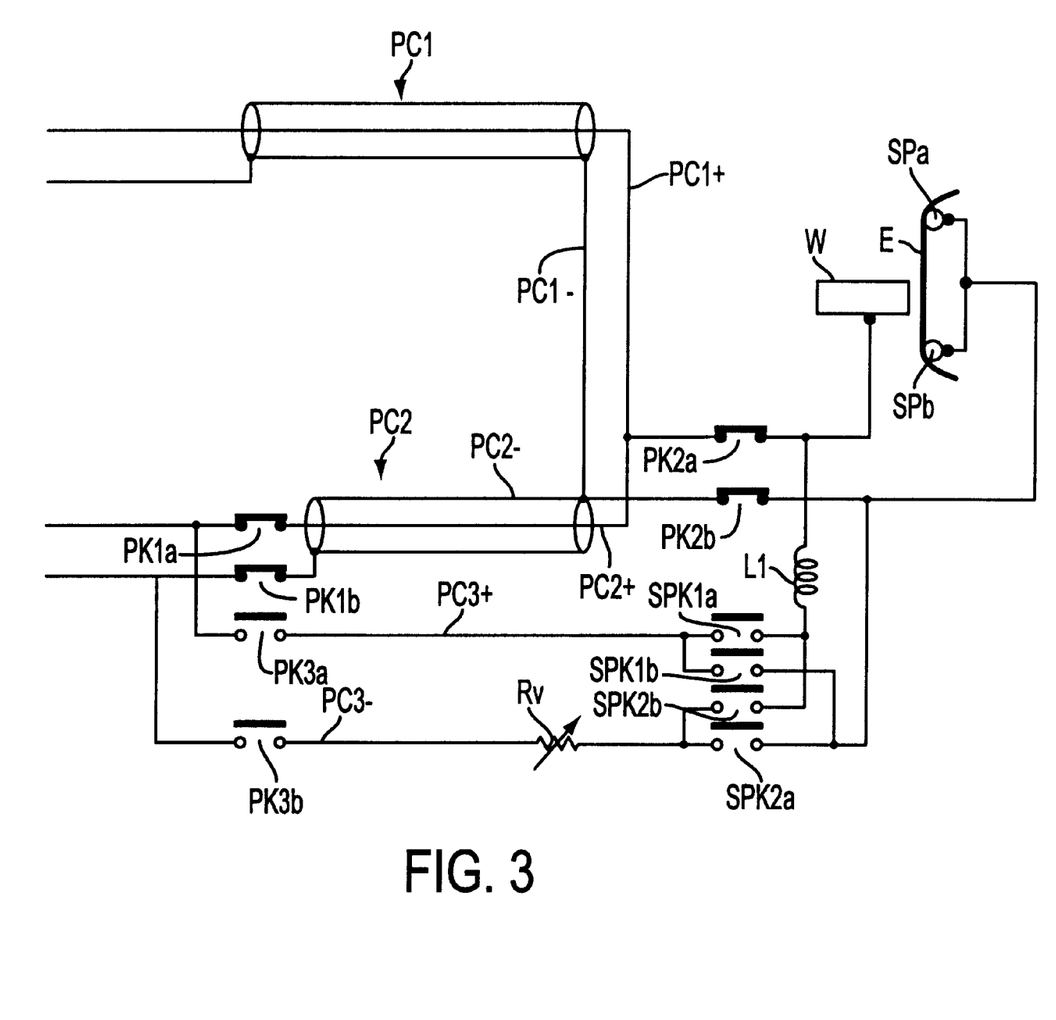
FIG. 3 is a diagram depicting an electromagnetic switch contact with the contact in the state where conventional machining is performed.

The connections shown in FIG. 3 illustrate the effective state when the connections between the cables PC3+ and PC3− and the power supply PS2 are open, and electrical energy from the power supplies PS1 and PS2 is supplied to the machining gap through the coaxial shielded power cables PC1 and PC2 respectively. The rough machining (first cut) step(s), through the approximately 4–5 $\mu$m Rmax finish, are preferably carried out using this connection. Then, by the connecting electromagnetic switch contacts SPK1a, SPK2a and PK3a, PK3b and connecting the output supply cables PC3+ and PC3− to the machining gap while opening the electromagnetic switch contacts PK1a, PK1b and PK2a, PK2b the connections between the coaxial shielded power cable PC1 and PC2 to the machining gap are opened, and a circuit for supplying small electric discharge energies is formed. Finish machining can then be performed to obtain the machining surface roughness shown in the graph of FIG. 1 (for a negative machining electrode polarity).

Returning to FIG. 2, the gate pulse control 10 is a device for generating a signal for ON/OFF control of the power supply PS1 and PS2 switching elements TrA and TrB by means of machining condition setting signals (electric discharge ON time, OFF time, peak current value, power supply selection, contact connection of various electromagnetic switches, variable resistor Rv setting signal, etc.) from an NC device (not shown). The gate pulse control 10 generates a signal to control one of either of the power supplies PS1 or PS2.

More specifically, the power supply PS1 comprises a parallel connection of a plurality, e.g., 32, FET elements each capable of passing a pulse current of about 50 A. The gate pulse control 10 sends a conduction signal, preferably having and ON time in the range of from about 100 nsec to 1600 nsec, to the multiple TrAs based on the setting signal from the NC device. Since there is essentially no resistance in the wiring, a maximum peak current of approximately 1600 A can be supplied to the machining gap in accordance with this conduction signal. The output voltage of the direct current power supply V1 at this time is set, for example, at about 280 V by an instruction from the NC device. By changing the output voltage from the direct current power supply V1, discharge energy appropriate to the workpiece thickness can be supplied to the machining gap. The power supply PS1 is used primarily for the first cut and the second cut.

If the power supply PS2 is selected by the NC device, the gate pulse control 10 will generate an ON/OFF control signal for the power supply PS2 switching element TrB. Based on the machining condition setting signal from the NC device, the gate pulse control 10 will send an ON/OFF control signal of a set length to the required number of switching circuits TrBs from among the multiple switching circuits SWC comprising the current limiting resistor R and gate switch TrB. For example, if the direct current power supply V2 output voltage is set at 80 V by the NC device, and the current limiting resistor R is 80 Ω, it will be possible to generate a 1A pulse current for each switching circuit SWC, and the energy supplied to the machining gap can be set by the number of controlling switch circuits SWC. Multiple passes of finish machining may be carried out in order to obtain a surface roughness of 4 to 5 $\mu$m Rmax using the electrical energy supplied by the power supply PS2. The machining process is carried out using the circuit connections as depicted in FIG. 3.

In the semifinal finish machining, from a surface roughness of e.g. 2 $\mu$m Rmax to a surface roughness of approximately e.g. 1 $\mu$m Rmax, the electromagnetic contacts PK1$a$, PK1$b$, PK2$a$, and PK2$b$ are opened by an instruction from the NC device thereby physically separating the coaxial shielded power cables PC1 and PC2 from the power supply PS2. By closing the contacts PK3$a$ and PK3$b$, the output supply cables PC3+ and PC3− are connected to the power supply PS2. Then, the electromagnetic switches SPK1$a$ and SPK2$a$ are connected on the positive side to the workpiece W and on the negative side to the wire electrode E respectively. At this point, machining polarity is the same as that used in prior wire cut electric discharge machines. Here, the reason for physically separating the coaxial shielded power cables PC1 and PC2 from the machining gap and the power supply PS2 is to prevent the energy accumulated as stray capacitance and held by the wiring, the power supply, etc. from affecting machining.

In this circuit connection, it is desirable that the stray capacitance ($C_E$) of the inductance element L1 and the power supply side of the variable resistor Rv (the left side of the terminal Tm4 in FIG. 2), including the stray capacitance contained in the wiring and the power supply device, be constrained to less than about 1,000 pF. This is because the circuit configuration consists of an RLC discharge circuit comprising the stray capacitance $C_E$, the variable resistor Rv, and the inductance element L1, and the energy supplied to the machining gap is determined by these elements. As the stray capacitance $C_E$ increases, the electric discharge energy grows proportionally, to the point that a finely finished machined surface becomes difficult to obtain.

If the values of the stray capacitance $C_E$, the variable resistor Rv, and the inductance element L1 are constant, the electric discharge energy will be dependent on the charging current and output voltage from the DC power supply V2 and on the current limiting resistor R, for charging the stray capacitance $C_E$. Given these circuit connections, the gate pulse control 10 preferably generates a control signal to the SWC TrB on only one of the multiple switching circuits SWC. Based on the settings designated by the operator, the NC device sets the output voltage and a TrB conduction time which determines the discharge time. The operator also selects a value for the variable resistor Rv. A voltage is supplied from the power supply PS2 and, when an electric discharge is generated, a pulsating current flows to the machining gap by means of the RLC circuit, With this very small electric discharge, the machined surface roughness may be finished to approximately 1 $\mu$m Rmax, while at the same time the machined shape accuracy may be brought as close as possible to the final dimensions.

Next, during final finishing by which the final machine surface roughness of less than 1 $\mu$m Rmax may be obtained, the circuit connections shown in FIG. 2 are established, whereby the electromagnetic switch contacts SPK1$a$ and SPK2$a$ are open, SPK1$b$ and SPK2$b$ are closed, and the wire electrode is maintained at a positive polarity and the workpiece at a negative polarity. As with the above described semifinal finish machining, energy may be supplied by the RLC discharge circuit, whereby an electric discharge will be generated in the machining gap.

Figure 4:
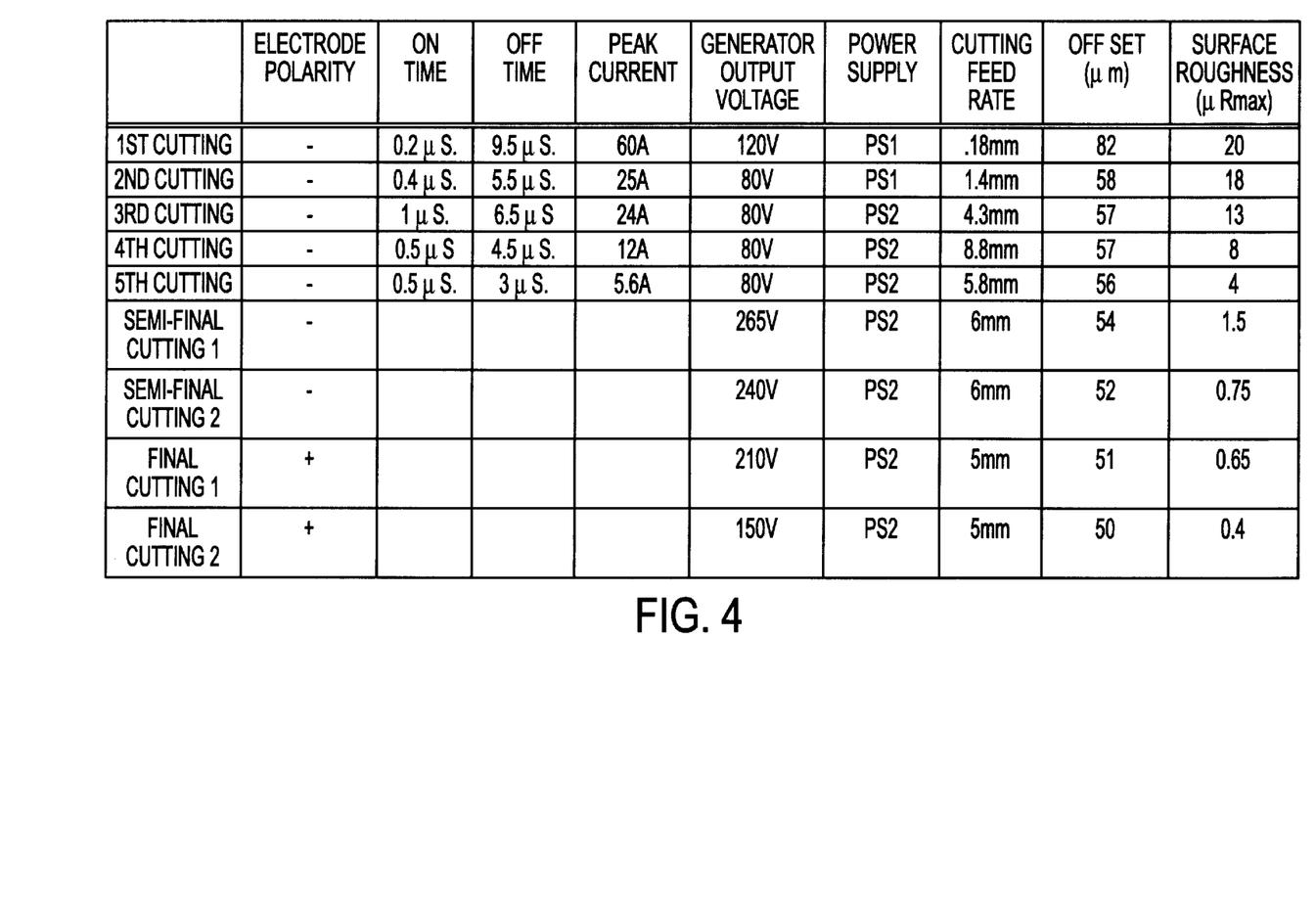
FIG. 4 is a diagram explaining the setting of parameter conditions used in connection with the various machining steps of the present invention.

FIG. 4 depicts, in table form, electrical energy conditions and other settings which may be used in connection with an EDM device according to the present invention for actual product machining, from the first cut to the final finish cut. An example is shown in which, using an SKD11 material workpiece having a thickness of 20 mm and a brass 0.1 mm diameter wire as the electrode, a workpiece was finished up to a surface roughness of 0.4 $\mu$m Rmax. In this example, electric discharge machining began with a first cut in which a profile shape was formed, and seven other cuts were performed prior to final finish machining. The left-most column of the table indicates the number and type of cut; from left to right the successive columns thereafter indicate the wire electrode machining polarity, the switching element conducting time and non-conducting time, the peak current supplied to the machining gap, the output voltages of the DC-power supplies V1 and V2, the energy-supplying power supplies PS1 and PS2, the set value for the relative feed speed between the workpiece and the wire electrode (a value set by the NC device), the offset value (which causes a shift by a fixed amount from the program path), and, finally the average machined surface roughness obtained using each of these conditions.

As shown in the table, in this example the high peak current-supplying power supply device PS1 was used for the first cut and second cut. In the third through fifth cuts, the machining shape accuracy and machined surface roughness were finished to approximately 4 to 5 µm Rmax using the power supply PS2 and gradually reducing the current peak value. Next, the semi-final cut stages, which are fine finishing machining stages in which the machined surface roughness is reduced. In the first semi-final cutting stage, surface roughness was refined to 1 to 2 µm Rmax by switching over to the RLC discharge circuit which supplies small discharge energies. An important point here is that during the second semi-final cutting the desired machined shape should be realized with great accuracy, i.e., to virtually the final dimension value. This is because when using the positive wire electrode polarity during the final cutting steps, virtually no workpiece removal by means or machining should be expected. During final cutting, it is more efficient to perform machining which only "shaves" the surface of the workpiece, and which only improves the machining surface finish by removing minute protuberances on the machined surface.

Figure 5:
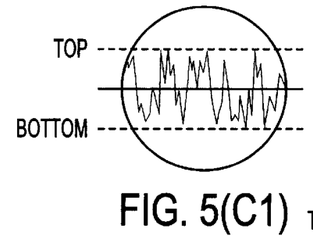
Figure 5A:
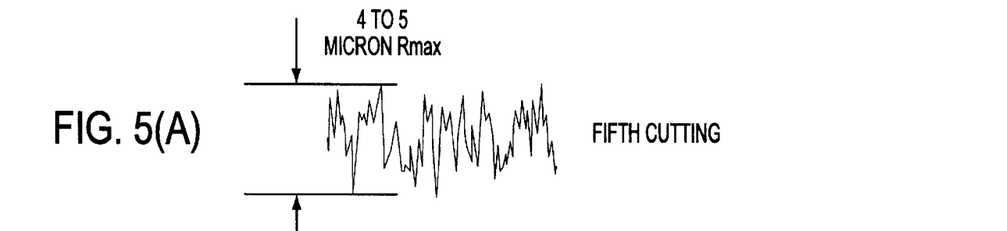
Figure 5B:
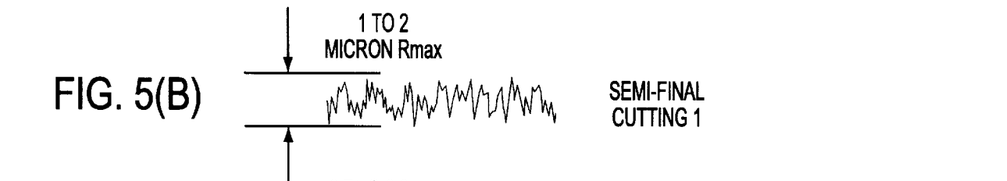
Figure 5C:
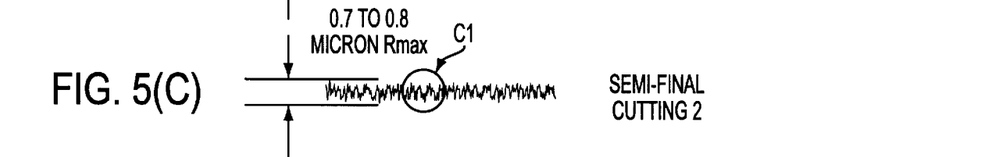
Figure 5D:
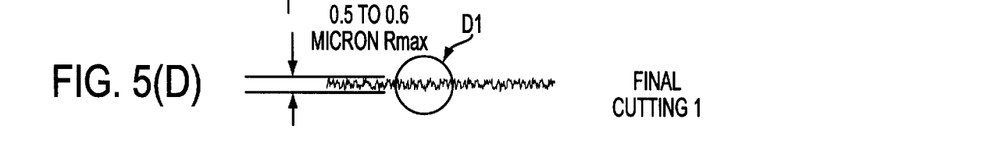
Figure 5E:
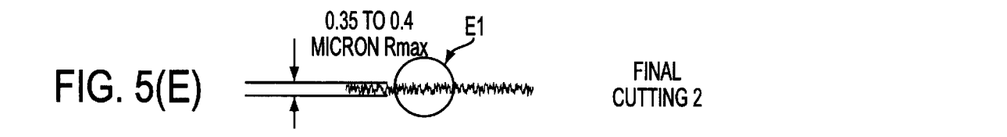

FIGS. 5(A)–(E) depict the state of the machined surface from the fifth cutting step to the two semi final cutting steps and to the two final cutting steps respectively. FIG. 5(A) depicts the machined surface after the fifth cut i.e., of the chart in FIG. 4, FIG. 5(B) depicts the first semi-final cut, FIG. 5(C) depicts the second semi-final cut, FIG. 5(D) depicts first final cut, and FIG. 5(E) depicts the second final cut. FIGS. 5(C1),(D1), and (E1) respectively, are expanded views of the circled portions in FIGS. 5(C),(D), and (E) respectively. After reaching a machined surface roughness of 4 to 5 µm Rmax by the fifth cut, the wire electrode travel path is shifted 2 µm and any raised portions on the machined surface from the first semi-final cut are removed to give a surface quality of approximately 1 to 2 µm Rmax, and any height variations in the machined surface are removed to yield a flat surface. The machined surface is then finished to approximately its final dimensions in the second semi-final cut. In the next step, any raised portions on the workpiece surface are removed and the machined dimensions are reduced by approximately 1 µm, so it is desirable that the dimensional accuracy to desired profile be as high as possible after this stage of machining. During the final machining cuts, any small ridges are completely removed down to a 0.8 µm Rmax machined surface accuracy as shown in FIG. 5(C1), and the surface quality shown in FIG. 5(D1) is achieved (first final cut). Here the surface roughness is approximately 60% of that in FIG. 5(C1) since the high potions have been removed from the surface depicted in FIG. 5(D1). In the second final (finish) cut, the machined surface is made even finer without increasing the depth of the "valley" portions. Compare FIG. 5(C1) and FIG. 5(D1).

The foregoing description of a preferred embodiment and example of the invention has been presented for purposes of illustration and description. It is not intended to be exhaustive or to limit the invention to the precise form disclosed, and obviously many modifications and variations are possible in light of the above teaching. The embodiment and example were chosen and described in order to best explain the principles of the invention and its practical application to thereby enable others skilled in the art to best utilize the invention in various embodiments machining processes and with various modifications as are suited to the particular use contemplated. It is intended that the scope of the invention be defined by the claims appended hereto.

We claim:

1. A method of wire cut electric discharge machining wherein an oil based machining fluid is interposed in a machining gap formed between a workpiece and a wire electrode, and electrical energy is supplied between the workpiece and wire electrode to generate an electric discharge across the gap, said method comprising the steps of:
   maintaining the wire electrode as a negative pole during a first discharge process for machining up to a first surface roughness; and
   maintaining the workpiece as a negative pole during a subsequent discharge process, whereby a machined surface roughness of the less than approximately 2 µm Rmax is obtained.

2. The method according to claim 1, wherein the dielectric machining fluid is mineral oil.

3. The method according to claim 1 wherein the first surface roughness is in the range of from about 1–2 µm Rmax and a surface roughness finer than said first surface is achieved during said subsequent discharge process.

4. A wire cut electric discharge machining method wherein an oil based dielectric machining fluid is interposed in a machining gap formed between a workpiece and a wire electrode, and electrical energy from a DC power supply is supplied between the workpiece and wire electrode to generate electric discharges across the gap, said method comprising the steps of:
   connecting the wire electrode to a negative pole of the power supply;
   connecting the workpiece to the positive pole of the power supply;
   moving the electrode and the workpiece relative to, each other offset from the final profile dimension to be formed in the workpiece;
   shifting the electrode travel path by a fixed amount toward the final desired profile dimensions; and
   finish machining the workpiece to a surface roughness to less than about 2 µm Rmax while maintaining the wire electrode at a positive machining polarity and the workpiece at a negative machining polarity, whereby roughness and machining accuracy are improved.

5. The method according to claim 4, wherein the surface roughness is less than about 1 µm Rmax.

6. A wire cut electric discharge machine in which an oil based dielectric machining fluid is interposed in a machining gap formed between a workpiece and a wire electrode during machining, and electrical energy is supplied from a DC power source to the machining gap by a spark discharge circuit to generate electric discharges therein, the wire cut electric, discharge machine comprising:
   a first power supply circuit for supplying discharge energy of in a first energy level to the machining gap to machine a profile shape;
   a second power supply circuit for supplying discharge energy of a second energy level, lower than the first energy level, to said machining gap to form a profile shape having an improved machined surface roughness characteristic, and
   a polarity reversing switch for switching the output polarity from the second power supply circuit with respect to the wire electrode and the workpiece electrode connections.

7. The wire cut electric discharge machine according to claim 6, wherein the second power supply circuit includes a variable direct current power source and a switching circuit for selectively connecting the power source to the machining gap.

8. The wire cut electrical discharge machine according to claim 6, wherein the dielectric machining fluid is mineral oil.

9. The wire cut electrical discharge machine according to claim 6, wherein the surface roughness of the workpiece is less than about 2 μm Rmax.

10. The wire cut electrical discharge machine according to claim 6, wherein the surface roughness of the workpiece is less than about 1 μm Rmax.

11. The wire cut electric discharge machine according to claim 6, wherein the first power supply circuit includes a variable, direct current power source and essentially no wiring resistance.

12. The wire cut electric discharge machine according to claim 6, wherein said polarity reversing switch is disposed in the spark discharge circuit between the second power supply circuit and the machining gap.

13. The wire electric discharge machine according to claim 12, further comprising a variable resistance in series with said polarity reversing switch.

14. The wire cut electric discharge machine according to claim 12, further comprising switches associated with said first and second power supplies respectively, for selectively connecting either the first or second power supply circuit to the machining gap.

15. The wire cut electric discharge machine according to claim 14, wherein the first and second power supply circuits are connected to said machining gap by shielded coaxial power cables and wherein said switches associated with said first and second power circuits are electromagnetic switches.

16. The wire cut electric discharge machining according to claim 14, further comprising an additional switching element in each of said first and second power supply circuits for controlling the gating of machining pulses from said power supply circuits into said machining gap.

17. A method for wire cut electric discharge machining a desired profile in a workpiece wherein an oil based dielectric machining fluid is interposed in a machining gap formed between a workpiece and a wire electrode and electrical energy from either a first power supply or a second power supply is selectively supplied across the machining gap to generate a electric discharge, said first power supply supplying discharge energy having a first energy level and said second power supply supplying discharge energy having a second, lower energy level, said method comprising:

(a) machining a first profile in said workpiece to a first surface finish using said first power supply;

(b) machining a second profile in said workpiece, closer to the desired profile than said first profile, using said second power supply; and (c) finish machining essentially to said desired profile using said second power supply with said workpiece being connected to the negative side of the second power supply and the wire electrode connected to a positive pole thereof.

18. The method according to claim 17, wherein said first power supply has a variable power source and essentially no circuit resistance for supplying a high peak current and further comprising the steps of setting the power source output in the range of from about 300 V to 60 V and machining with a machining pulse on time in the range of from about 100 nsec to 1600 nsec.

19. The method according to claim 17, wherein said second power supply has a variable power source and a current limiting resistor and further comprising the steps of setting the power source output in the range of from about 300 V to 80 V whereby a surface finish of between about 4 μm to 5 μm Rmax is achieved.

20. The method according to claim 19, further comprising the steps of disconnecting the second power supply from the machining gap and connecting the second power supply to the machining gap via a low capacitance circuit having a variable resistor and a polarity reversing switch with the workpiece connected to the negative side of the second power supply and the wire electrode connected to the positive side; and machining to a surface roughness of less than about 2 μm Rmax.

* * * * *